United States Patent
Stepin et al.

(10) Patent No.: US 10,965,958 B2
(45) Date of Patent: Mar. 30, 2021

(54) MIXED DOMAIN COLLABORATIVE POST FILTER FOR LOSSY STILL IMAGE CODING

(71) Applicant: Huawei Technologies Co., Ltd., Shenzhen (CN)

(72) Inventors: Victor Alexeevich Stepin, Moscow (RU); Roman Igorevich Chernyak, Moscow (RU); Albert Yurievich Silantiev, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 16/448,956

(22) Filed: Jun. 21, 2019

(65) Prior Publication Data
US 2019/0313124 A1    Oct. 10, 2019

Related U.S. Application Data

(63) Continuation of application No. PCT/RU2016/000917, filed on Dec. 23, 2016.

(51) Int. Cl.
*H04N 19/635* (2014.01)
*H04N 19/117* (2014.01)
(Continued)

(52) U.S. Cl.
CPC ........... *H04N 19/635* (2014.11); *G06T 5/002* (2013.01); *G06T 5/10* (2013.01); *G06T 9/00* (2013.01);
(Continued)

(58) Field of Classification Search
CPC .... H04N 19/635; H04N 19/154; H04N 19/86; H04N 19/82; H04N 19/60; H04N 19/19;
(Continued)

(56) References Cited

U.S. PATENT DOCUMENTS

2008/0310750 A1    12/2008    Osamoto et al.
2010/0158103 A1    6/2010    Ye et al.
(Continued)

FOREIGN PATENT DOCUMENTS

CN    102292990 A    12/2011
CN    102342101 A    2/2012
(Continued)

OTHER PUBLICATIONS

Chen et al., "Classified Quadtree-based Adaptive Loop Filter," 2011 IEEE International Conference on Multimedia and Expo, pp. 1-6, Institute of Electrical and Electronics Engineers—New York, New York (2011).
(Continued)

*Primary Examiner* — Amandeep Saini
(74) *Attorney, Agent, or Firm* — Leydig, Voit & Mayer, Ltd.

(57) ABSTRACT

An image coding apparatus, comprising an image reconstruction unit configured to reconstruct an image, a parameter determination unit configured to determine one or more filter parameters, based on one or more first parameters which are based on the reconstructed image and one or more second parameters which are based on codec signaling information, and a mixed-domain filtering unit configured to filter in a frequency domain and a pixel domain the reconstructed image based on the determined filter parameters to obtain a filtered image.

11 Claims, 13 Drawing Sheets

(51) Int. Cl.

| | | |
|---|---|---|
| *H04N 19/147* | (2014.01) | |
| *H04N 19/172* | (2014.01) | |
| *H04N 19/196* | (2014.01) | |
| *G06T 9/00* | (2006.01) | |
| *H04N 19/154* | (2014.01) | |
| *H04N 19/86* | (2014.01) | |
| *H04N 19/82* | (2014.01) | |
| *H04N 19/60* | (2014.01) | |
| *H04N 19/19* | (2014.01) | |
| *G06T 5/10* | (2006.01) | |
| *H04N 19/176* | (2014.01) | |
| *G06T 5/00* | (2006.01) | |

(52) U.S. Cl.
CPC ......... *H04N 19/117* (2014.11); *H04N 19/147* (2014.11); *H04N 19/154* (2014.11); *H04N 19/172* (2014.11); *H04N 19/176* (2014.11); *H04N 19/19* (2014.11); *H04N 19/196* (2014.11); *H04N 19/60* (2014.11); *H04N 19/82* (2014.11); *H04N 19/86* (2014.11); *G06T 2207/20021* (2013.01); *G06T 2207/20048* (2013.01)

(58) Field of Classification Search
CPC .. H04N 19/176; H04N 19/117; H04N 19/147; H04N 19/172; H04N 19/196; G06T 5/10; G06T 5/002; G06T 9/00; G06T 2207/20021; G06T 2207/20048
USPC ......................................................... 382/239
See application file for complete search history.

(56) References Cited

U.S. PATENT DOCUMENTS

| | | | |
|---|---|---|---|
| 2010/0309377 A1 | 12/2010 | Schoenblum et al. | |
| 2011/0222597 A1 | 9/2011 | Xu et al. | |
| 2011/0274158 A1 | 11/2011 | Fu et al. | |
| 2012/0177104 A1 | 7/2012 | Budagavi et al. | |
| 2012/0288213 A1 | 11/2012 | Amon et al. | |
| 2013/0003871 A1 | 1/2013 | Bjontegaard et al. | |
| 2013/0094569 A1 | 4/2013 | Chong et al. | |
| 2015/0117537 A1 | 4/2015 | Luo et al. | |
| 2017/0201770 A1 | 7/2017 | Chen et al. | |
| 2018/0249159 A1 | 8/2018 | Narroschke et al. | |

FOREIGN PATENT DOCUMENTS

| | | | | |
|---|---|---|---|---|
| CN | 102763415 | A | 10/2012 | |
| CN | 102972022 | A | 3/2013 | |
| EP | 1841230 | A1 | 10/2007 | |
| EP | 2375747 | A1 * | 10/2011 | ........... H04N 19/147 |
| EP | 2375747 | A1 | 10/2011 | |
| WO | 2011081637 | A1 | 7/2011 | |
| WO | 2013155084 | A1 | 10/2013 | |

OTHER PUBLICATIONS

Chen et al., "Coding tools investigation for next generation video coding based on HEVC," Applications of Digital Image Processing, pp. 1-10, Institute of Electrical and Electronics Engineers—New York, New York (Sep. 2015).

Zhang et al., "Image postprocessing by Nonlocal Kuan"s filter," Journal of Visual Communication and Image, pp. 251-262. XP028172660, Department of Electronic Engineering, The Chinese University of Hong Kong, Shantin, N. T., Hong Kong (2011).

Gao et al.,"In-Loop filter," Advanced Video Coding Systems, XP055406760, pp. 115-134, Springer International Publishing (Jan. 1, 2014).

Maggioni et al., "Video Denoising, Deblocking, and Enhancement Through Separable 4-D Nonlocal Spatiotemporal Transforms," IEEE Transactions on Image Processing, vol. 21, No. 9, pp. 3952-3966, XP011492148, Institute of Electrical and Electronics Engineers—New York, New York (Sep. 2012).

Dabov et al., "Image Denoising by Sparse 3-D Transform-Domain Collaborative Filtering," IEEE Transactions on Image Processing, vol. 16, No. 8, pp. 2080-2095, XP011485829, Institute of Electrical and Electronics Engineers—New York, New York (Aug. 2007).

Zhang et al., "Low-Rank Decomposition-Based Restoration of Compressed Images via Adaptive Noise Estimation," IEEE Transactions on Image Processing, vol. 25, No. 9, pp. 4158-4171, XP011617745, Institute of Electrical and Electronics Engineers—New York, New York (Sep. 2016).

Zhang et al., "Transform-Domain In-Loop Filter with Block Similarity for HEVC," Chengdu, China, pp. 1-4, XP055405520, Institute of Electrical and Electronics Engineers—New York, New York (Nov. 27-30, 2016).

Dabov et al., "Video Denoising by Sparse 3D Transform-Domain Collaborative Filtering," 2007 15th European Signal Processing Conference, pp. 1-5, XP032772966, Copyright by EURASIP (Sep. 3-7, 2007).

"Series H: Audiovisual and Multimedia Systems Infrastructure of audiovisual services—Coding of moving video, Advanced video coding for generic audiovisual services," ITU-T H.264, pp. 1-804, International Union of Telecommunication—Geneva, Switzerland (Oct. 2016).

"Series H: Audiovisual and Multimedia Systems Infrastructure of audiovisual services—Coding of moving video, High efficiency video coding," ITU-T H.265, pp. 1-634, International Union of Telecommunication—Geneva, Switzerland (Apr. 2015).

* cited by examiner $B = \{b_1, b_2, ..., b_M\} = CreatePartitions(\vec{S}, n)$ - Partitioning procedure, n - partition size

For each $b_i$ in $B$

-Block Matching Procedure

(Find k closest blocks for $b_i$ in $\vec{S}$ using MSE metric):

$P_i = BlockMatch(\vec{S}, b_i)$, where

$P_i = \{b_i, p_i^1, p_i^2, ..., p_i^{k-1}\}$

-2D transform for each pixel patch: $F_i = 2Dtransform(P_i)$

| General case | Wiener filter |
|---|---|
| $G_i = Func(F_i, N)$ | - Stack transform for each patch group<br>$TF_i = \|tf_{\omega}\| = StackTransform(F_i)$<br>- Frequency Impulse Response calculation for stack spectrum<br>$G_i(\Omega) = \|g'_{\omega}(\Omega)\|$<br>$g'_{\omega}(\Omega) = \dfrac{(tf_{\omega}(\Omega))^2}{(tf_{\omega}(\Omega))^2 + N^2}$ |

Partitioning $B = \{b_1, b_2, \ldots, b_M\} = CreatePartitions(S, n)$

For each $b_j$ in $B$

Block matching $P_j = BlockMatch(S, b_j)$

Forward 2D transform $F_j = 2Dtransform(P_j)$ $R_j = FreqCollaborativeFiltering(F_j, G)$

Inverse 2D transform $\tilde{P}_j = Inverse2DTransform(R_j)$

Pixel domain collaborative filtering $O = SameBlockAvg(\tilde{P}_0, \tilde{P}_1, \ldots, \tilde{P}_M)$

Partitioning $B = (b_1, b_2, \ldots, b_M) = CreatePartition(S, n)$

For each $b_i$ in $B$

Block matching $P_i = BlockMatch(S, b_i)$

Forward 2D transform $F_i = 2DTransform(P_i)$

Secondary stack transform $TF_i = \|f_{i,j,k}\| = StackTransform(F_i)$

Frequency domain filtering $\widetilde{TF}_i = TF_i \circ G_i$

Inverse secondary transform $R_i = InverseStackTransform(\widetilde{TF}_i)$

Inverse 2D transform $\widetilde{P}_i = Inverse2DTransform(R_i)$

Pixel domain collaborative filtering $O = SameBlockAvg(\widetilde{P}_1, \widetilde{P}_2, \ldots, \widetilde{P}_M)$

MIXED DOMAIN COLLABORATIVE POST FILTER FOR LOSSY STILL IMAGE CODING

CROSS-REFERENCE TO RELATED APPLICATIONS

This application is a continuation of International Application No. PCT/RU2016/000917, filed on Dec. 23, 2016, the disclosure of which is hereby incorporated by reference in its entirety.

TECHNICAL FIELD

Embodiments of the present invention relate to an image coding apparatus, a system comprising an image encoding apparatus and an image decoding apparatus, and a method for still image coding. Embodiments of the present invention also relate to a computer-readable storage medium storing program code, the program code comprising instructions for carrying out such a method.

BACKGROUND

Still image compression technologies can be used e.g. in still image codecs such as H.264/AVC, H.265/HEVC and JPEG. Improvement of the decoded image can be achieved by post filtering. There are two base classes of post filtering: encoder side post filtering and decoder side post filtering.

In case of encoder side post filtering, filter parameters are estimated on the encoder side and are then transferred to the decoder side. The decoder recovers post filter parameters after transmission and applies filter parameters for decoded image filtering before delivery to the end user. In this case filter design and filter parameter estimation depend on the still image encoder architecture.

In case of decoder side post filtering post filter parameters are estimated from the decoded image and so there is no still image encoder modification.

The most familiar encoder side post filter is the Adaptive Loop Filter. This filter was proposed on MPEG standardization meeting for use in the Next Generation Video codec.

A still image decoder recovers post filter parameters from a transmitted bitstream and uses these parameters for decoded image filtering before end user delivery.

According to an Adaptive Loop Filter (ALF) method, each reconstructed (decoded) image is divided into a set of small macroblocks (super-pixels) and then each macroblock is filtered by an adaptive post filter.

An ALF can comprise three blocks: A parameter estimation block, a pixel domain filtering block and an application map block. In the encoder, the parameter estimation block estimates a 2D impulse response for a Wiener filter in pixel domain for each macroblock based on matching between original and reconstructed images. Then these impulse responses are quantized and transferred to an entropy encoder. The entropy encoder inserts encoded filter parameters into an output bitstream transferred from encoder to decoder side. In the decoder, the entropy decoder recovers the Wiener filter impulse response for each macroblock and transfers filter parameters to the pixel domain filtering block for use in the filtering process. In the decoder and the encoder the pixel domain filtering block performs reconstructed image filtering in pixel domain according to filter parameters from the parameter estimation block. In the decoder the filtered image is used for decoded image improvement before end user delivery. Filtering can be applied not for full reconstructed frame but only for part of image. In the encoder the application map block chooses which super-pixels should be filtered based on a rate-distortion optimization (RDO) process. The application map is encoded by the entropy encoder and written into the output bitstream on the encoder side. In the decoder the entropy decoder recovers the filter application map. Then this map is used to turn on/off filtering.

The ALF can have the following base features for still image encoding:
- The filter impulse response is derived based on original and filtered reconstructed images matching
- Filter parameters are transferred from encoder to decoder side
- Filtering is performed in the pixel domain
- The filter is applied as a post filter (decoded picture improvement)
- The application map is built based on an RDO process Despite advantages of the ALF structure, there is still a need for improvements in image coding.

SUMMARY OF THE INVENTION

The objective of the present invention is to provide an image coding apparatus, a system comprising an image encoding apparatus and an image decoding apparatus, and a method for still image coding, wherein the image coding apparatus, the system and the method overcome one or more of the problems of the prior art.

A first aspect of the invention provides an image coding apparatus, comprising:
- an image reconstruction unit configured to reconstruct an image,
- a parameter determination unit configured to determine one or more filter parameters, based on one or more first parameters which are based on the reconstructed image and one or more second parameters which are based on codec signaling information, and
- a mixed-domain filtering unit configured to filter in a frequency domain and a pixel domain the reconstructed image based on the determined filter parameters to obtain a filtered image.

The image coding apparatus can be an encoder or a decoder for still images. It is understood that filtering the reconstructed image does not necessarily refer to filtering the entire image. For example, in some embodiments only some blocks of the reconstructed image may be filtered.

The image coding apparatus of the first aspect has the advantage that the filter parameters can be derived on the decoder-side and do not need to be encoded into the bitstream, thus an improved coding efficiency can be achieved.

Preferably, the parameter determination unit is configured to determine the one or more image filter parameters based only on the reconstructed image and not on the original image on the encoder side. Since the parameter determination unit thus does not require the original image, the parameters can be determined in the same way based on the reconstructed image, both at the encoder side and at the decoder side (where the original image is not available).

In a first implementation of the image coding apparatus according to the first aspect, the parameter determination unit is configured to estimate the original image from the reconstructed image and determine the first parameters based on the estimated original image.

Original signal estimating allows roughly removing quantization noise and better estimating original signal parameters (for example original signal spectrum). Thus, an improved determination of the first parameters can be performed based on the estimated original image compared to determining the first parameters based on the reconstructed image.

In a second implementation of the image coding apparatus according to the first aspect as such or according to the first implementation of the first aspect, the parameter determination unit is configured to determine a quantization noise value from the codec signaling information and determine the second parameters based on the derived quantization noise value.

This has the advantage that the filter parameters can be determined with higher accuracy Preferably, the quantization noise value can be derived analytically from the codec signaling information.

In a third implementation of the image coding apparatus according to the first aspect as such or according to any of the preceding implementations of the first aspect, the parameter determination unit is configured to analytically derive the quantization noise value from a quantization parameter QP of the codec signaling information.

This has the advantage that the quantization noise value can be determined efficiently and with high accuracy.

In a fourth implementation of the image coding apparatus according to the first aspect as such or according to any of the preceding implementations of the first aspect, the image coding apparatus further comprises an application map unit configured to determine where filtering should be implemented.

Preferably, the application map unit is implemented at the encoder side, and corresponding signaling information is transferred to the decoder side.

In a fifth implementation of the image coding apparatus according to the first aspect as such or according to any of the preceding implementations of the first aspect, the parameter determination unit is configured to determine the filter parameters by:
  partitioning the estimated original image into blocks, and for each of the blocks:
    determining a cluster of patches that are similar to the block,
    2D-transforming the cluster of patches to obtain transformed patches, and
    determining the first parameters based on the transformed patches.

In a sixth implementation of the image coding apparatus according to the first aspect as such or according to any of the preceding implementations of the first aspect, the parameter determination unit is configured to determine, for each of the blocks, the filter parameters based on the transformed patches by:
  regrouping elements of the transformed patches to obtain a matrix $T_i$, wherein each row of the matrix $T_i$ comprises frequency components with same spatial frequencies,
  transforming the matrix $T_i$ to obtain a transformed matrix $tf_{vw}^i$, wherein each row of the matrix $tf_{vw}^i$ is a 1D transform of a corresponding row of matrix $T_i$, and
  determining the filter parameters $g_{vw}^i$ as:

$$g_{vw}^i(\Omega) = \frac{(tf_{vw}^i(\Omega))^2}{(tf_{vw}^i(\Omega))^2 + N^2}$$

wherein $\Omega$ is a column number in matrix $tf_{vw}^i$, spatial frequencies v, w correspond to a j-th row of matrix $tf_{vw}^i$ and N is a quantization noise value derived from the codec signaling information.

In a seventh implementation of the image coding apparatus according to the first aspect as such or according to any of the preceding implementations of the first aspect, the mixed-domain filtering unit is configured to, for each of a set of blocks of the reconstructed image:
  determine a set of patches that are similar to the block,
  2D-transform the patches into frequency domain to obtain frequency-domain patches,
  perform collaborative filtering of the frequency-domain patches in frequency domain to obtained filtered transformed frequency-domain patches,
  inverse 2D transform the filtered transformed frequency-domain patches in frequency domain to obtain filtered patches, and
  perform collaborative filtering of the filtered patches in pixel domain along pixel patches from different sets of patches with the same spatial coordinates.

Preferably, the set of blocks of the reconstructed image covers the entire reconstructed image. The blocks can represent a segmentation of the reconstructed image (i.e., they are non-overlapping) or they can cover the reconstructed image in an overlapping manner.

In an eighth implementation of the image coding apparatus according to the first aspect as such or according to any of the preceding implementations of the first aspect, the 2D transformation is a Haar wavelet transform.

In a ninth implementation of the image coding apparatus according to the first aspect as such or according to any of the preceding implementations of the first aspect, the mixed-domain filtering unit is configured to perform, for each of the blocks, the collaborative filtering based on the transformed patches by:
  regrouping elements of the transformed patches to obtain a matrix $T_i$, wherein each row of the matrix $T_i$ comprises frequency components with same spatial frequencies,
  transforming the matrix $T_i$ to obtain a transformed matrix $tf_{vw}^i$, wherein each row of the matrix $tf_{vw}^i$ is a 1D transform of a corresponding row of matrix $T_i$, and
  perform filtering by multiplying each element of matrix $tf_{vw}^i$ by a filter parameter $g(\Omega)_{vw}^i$,
wherein $\Omega$ is a column number in matrix $tf_{vw}^i$ and spatial frequencies v, w correspond to a j-th row of matrix $tf_{vw}^i$.

In a tenth implementation of the image coding apparatus according to the first aspect as such or according to any of the preceding implementations of the first aspect, the 1D transformation is a Hadamard transform.

In an eleventh implementation of the image coding apparatus of the second aspect,
  the adaptive_filtering_flag flag is used to indicate that the mixed-domain filtering unit should be used to filter an image,
  the frame_level_usage_flag flag is used to indicate that the entire reconstructed image should be filtered,
  the macroblock_size field is used to indicate a macroblock size which should be used for filtering, and/or
  the use_filtered_mb_flag flag is used to indicate whether a filtered macroblock should be used.

The above-mentioned flags can be e.g. encoded by the encoder into the bitstream.

A second aspect of the invention refers to a system comprising an image encoding apparatus according to the first aspect or one of its implementations and an image decoding apparatus according to the first aspect or one of its implementations, wherein the parameter determination unit of the image encoding apparatus is configured to determine the filter parameters in the same way as the parameter determination unit of the image decoding apparatus.

This system has the advantage that no transmission of filter parameters from the encoder side to the decoder side is required. Thus, a coding efficiency can be improved.

A third aspect of the invention refers to a method for still image coding, the method comprising:

reconstructing an image, determining one or more filter parameters based on one or more first parameters which are based on the reconstructed image and one or more second parameters which are based on codec signaling information, and filtering in a frequency domain and in a pixel domain the reconstructed image based on the determined filter parameters to obtain a filtered image.

The methods according to the third aspect of the invention can be performed by the image coding apparatus according to the first aspect of the invention. Further features or implementations of the method according to the third aspect of the invention can perform the functionality of the image coding apparatus according to the first aspect of the invention and its different implementation forms.

A fourth aspect of the invention refers to a computer-readable storage medium storing program code, the program code comprising instructions for carrying out the method of the third aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, modifications on these embodiments are possible without departing from the scope of the present invention as defined in the claims.

FIG. 8 shows pseudo code of a filter parameter estimation block in accordance with a further embodiment of the present invention, FIG. 11 shows pseudo code of a mixed-domain collaborative filtering block in accordance with a further embodiment of the present invention, FIG. 12 shows pseudo code of a mixed-domain collaborative filtering block in accordance with a further embodiment of the present invention.

DETAILED DESCRIPTION OF THE EMBODIMENTS

Figure 1:
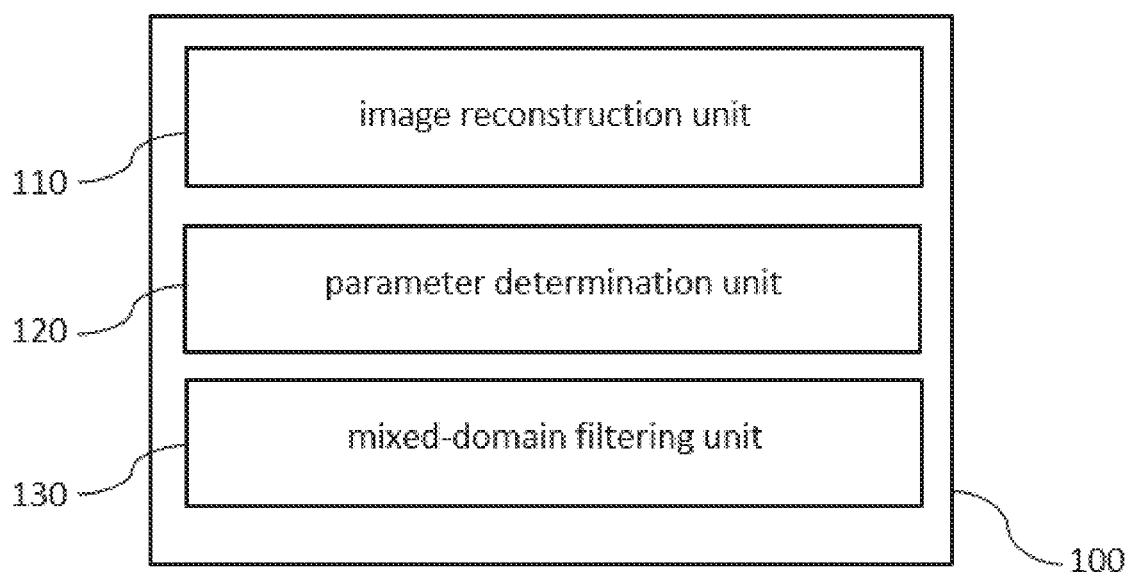
FIG. 1 is a block diagram illustrating an image coding apparatus in accordance with an embodiment of the present invention.

FIG. 1 shows an image coding apparatus 100.

The image coding apparatus 100 comprises an image reconstruction unit 110, a parameter determination unit 120 and a mixed-domain filtering unit 130.

The image reconstruction unit 110 is configured to reconstruct an image.

The parameter determination unit 120 is configured to determine one or more filter parameters, based on one or more first parameters which are based on the reconstructed image and one or more second parameters which are based on codec signaling information.

The mixed-domain filtering unit 130 is configured to filter in a frequency domain and a pixel domain the reconstructed image based on the determined filter parameters to obtain a filtered image.

The image coding apparatus 100 can be an encoder and/or a decoder.

Figure 2:
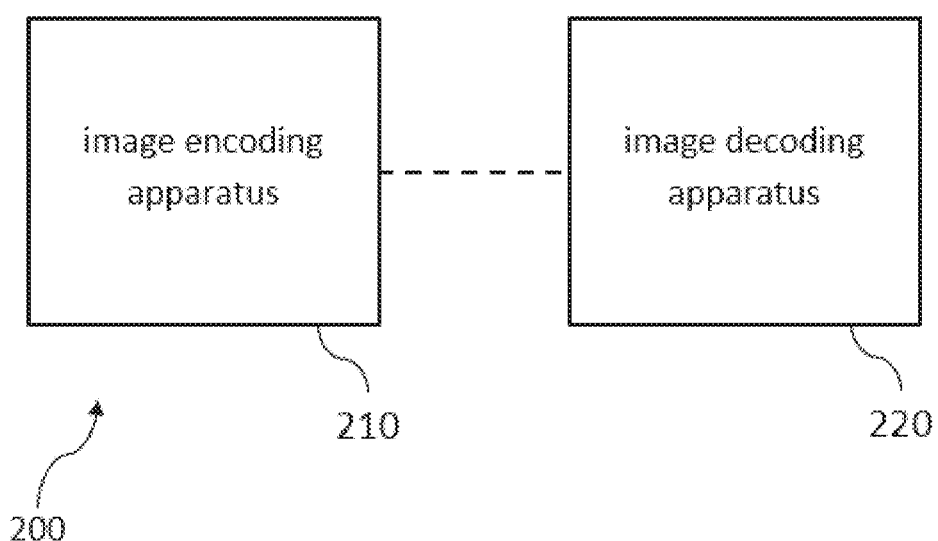
FIG. 2 is a block diagram illustrating a system comprising an image encoding apparatus and an image decoding apparatus in accordance with a further embodiment of the present invention.

FIG. 2 shows a system 200 comprising an image encoding apparatus 210 and an image decoding apparatus 220, wherein the parameter determination unit of the image encoding apparatus is configured to determine the filter parameters in the same way as the parameter determination unit of the image decoding apparatus. The dashed line between the image encoding apparatus 210 and the image decoding apparatus 220 indicates that a bitstream may be transferred from the image encoding apparatus 210 to the image decoding apparatus 220. The image encoding apparatus 210 and/or the image decoding apparatus 220 may be configured as described in FIG. 1.

Figure 3:
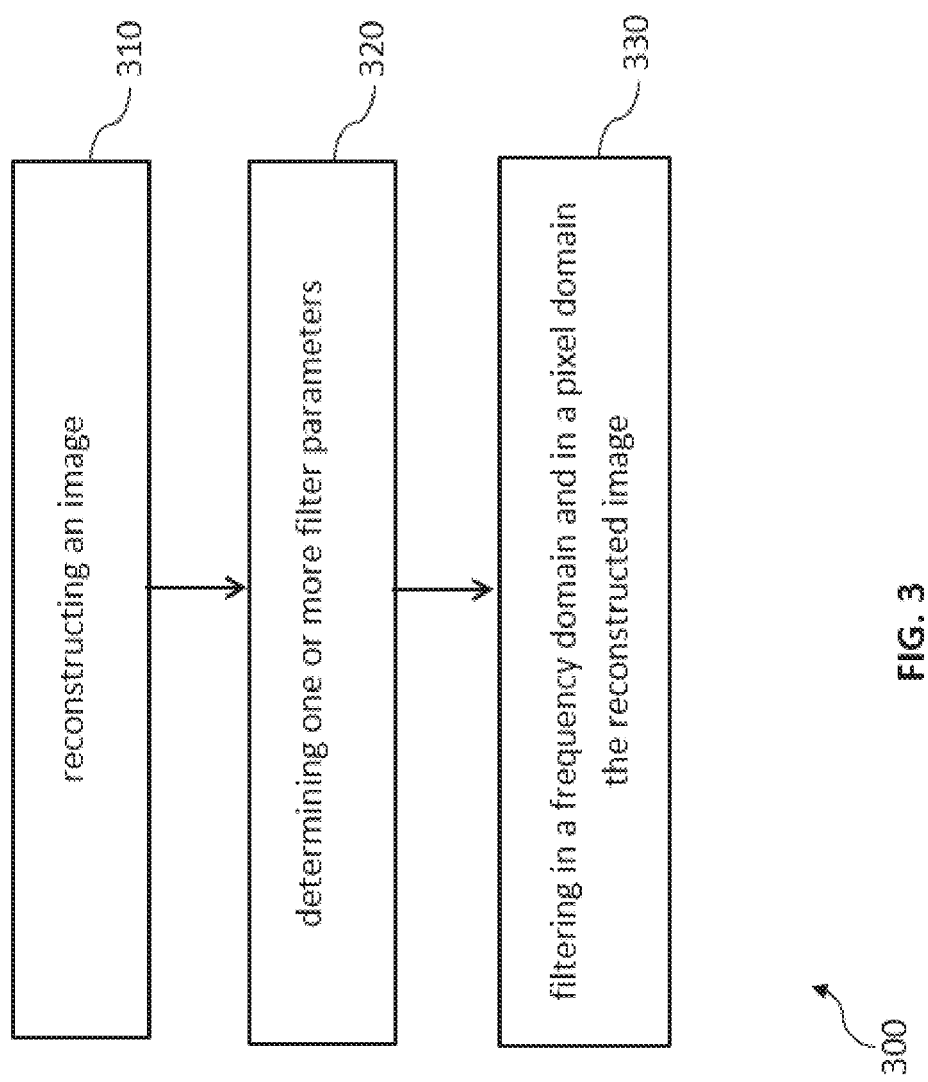
FIG. 3 is a flow chart of a method for still image coding in accordance with a further embodiment of the present invention.

FIG. 3 shows a method 300 for still image coding.

The method comprises a first step 310 of reconstructing an image.

The method comprises a second step 320 of determining one or more filter parameters based on one or more first parameters which are based on the reconstructed image and one or more second parameters which are based on codec signaling information.

The method comprises a third step 330 of filtering in a frequency domain and in a pixel domain the reconstructed image based on the determined filter parameters to obtain a filtered image.

The reconstructed (decoded) image can be divided into a set of small macroblocks and then each macroblock can be filtered by a filter as described below.

Figure 4:
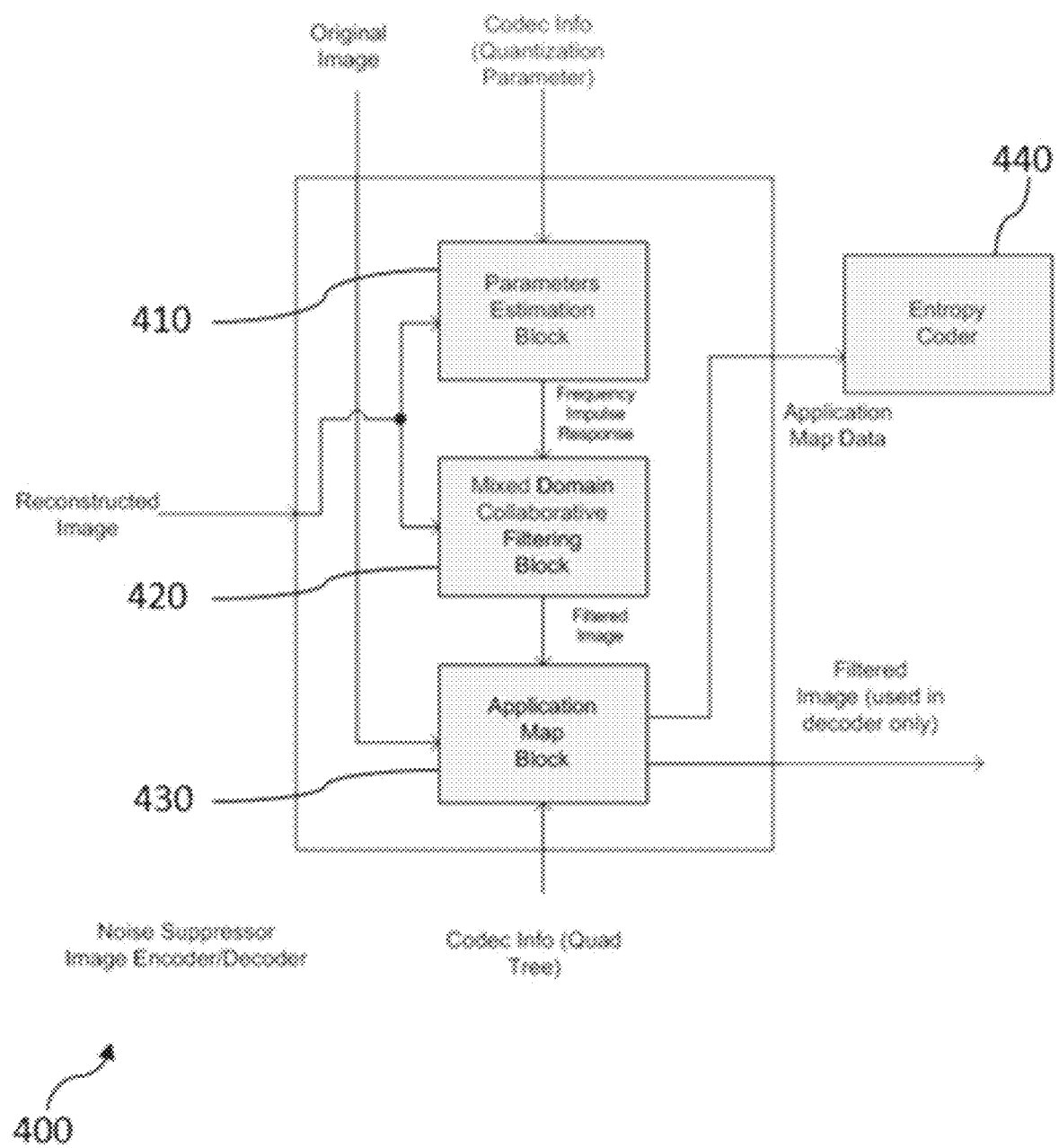
FIG. 4 is a block diagram of a filter in accordance with a further embodiment of the present invention.

FIG. 4 is a block diagram of a filter, which is preferably used as a post filter on the encoder side.

The filter 400 comprises three blocks: a parameter estimation block 410, a mixed domain collaborative filtering block 420 and an application map block 430.

Similar to ALF, the parameter estimation block 410 calculates filter parameters. But in contrast to ALF, the filter parameters are calculated without knowledge of the source image. The filter parameter estimation is based on two groups of input parameters. The first group of parameters is estimated based on the reconstructed image and the second group of parameters is derived from codec signaling information which are already transferred from the encoder to the decoder. According to the above described procedure the filter parameters can be estimated on the decoder side and so filter parameters should not be transferred from the encode to decoder side. Similar to ALF, a parameter estimation block calculates the filter impulse response, but the parameter estimation block 410 of filter 400 estimates a frequency impulse response, because base filtering is performed in frequency domain. The frequency domain implementation allows building a more efficient non-linear filter. The frequency impulse response is an example of filter parameters.

In contrast to ALF, which performs local filtering in pixel domain, non-local collaborative filtering is performed in a mixed domain (spatial frequency and pixel domain). Such approach allows more efficient usage of spatial redundancy. Initial filtering is performed in frequency domain and the final averaging is performed in pixel domain.

Similar to ALF, during the RDO process the application map block determines areas where filtering should be applied. If the coding gain from removing quantization noise from the decoded image is significantly more than degradation of the filtered decoded image, then filtering is applied. Otherwise, the unfiltered reconstructed image is used as output for the end user.

The filter 400 can be used as decoder side post filter, too. In this case the application map block 430 can be excluded from the post filter design and there is no additional bit budget for application map transmission. Of course, in this case coding gain will be decreased, but it will be significant also.

The application map block 430 generates application map data that is provided to an entropy coder 440.

Figure 5:
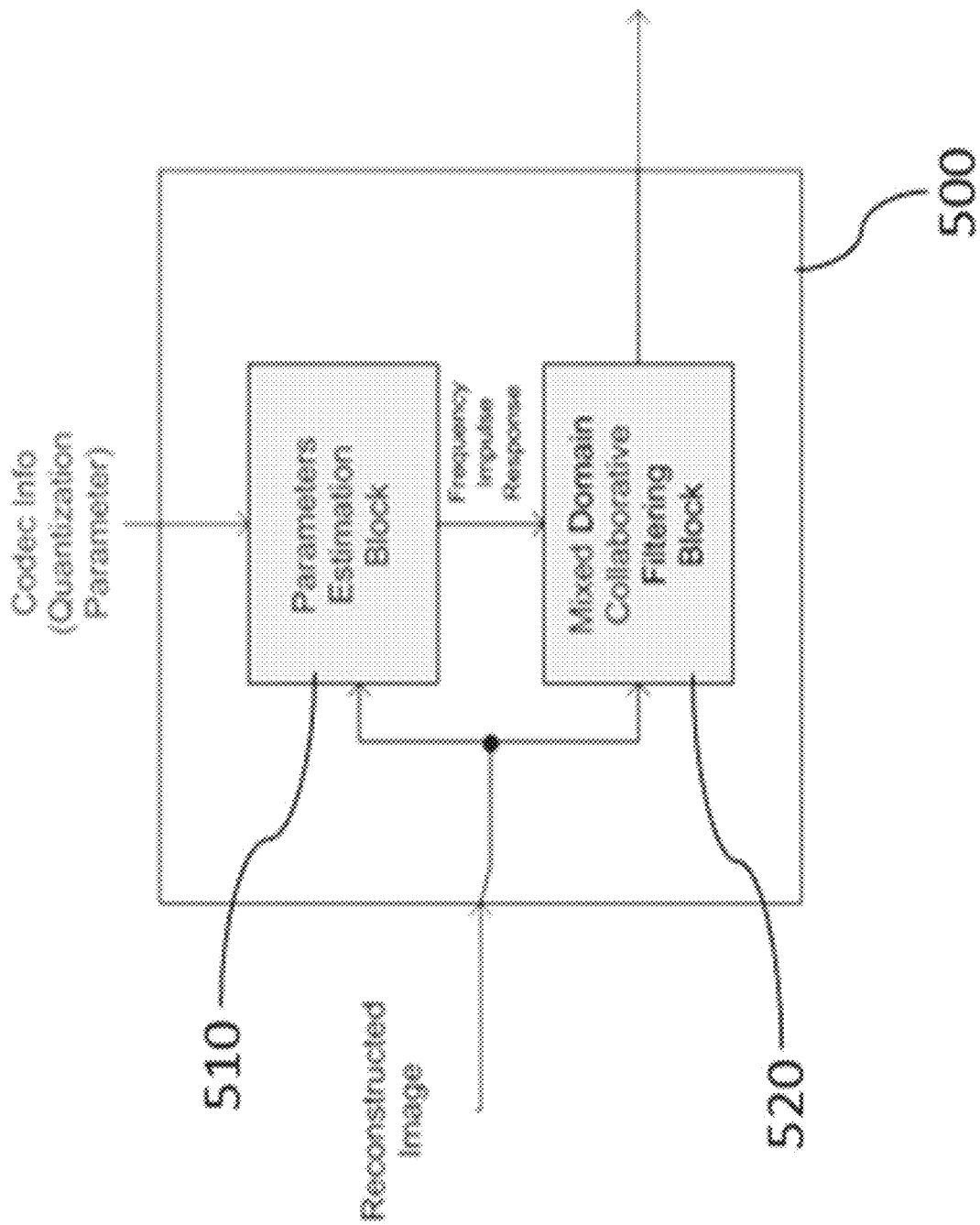
FIG. 5 is a block diagram of a filter in accordance with a further embodiment of the present invention.

FIG. 5 is a block diagram of a filter 500, which can be used preferably as post filter on the decoder side. The filter 500 comprises a parameter estimation block 510 and a mixed-domain collaborative filtering block 520. The parameter estimation block 510 determines a frequency impulse response, which is a filter parameter, and provides this to the mixed domain collaborative filtering block 520. Both the parameter estimation block 510 and the mixed domain collaborative filtering block are provided with the reconstructed image as input.

Figure 6:
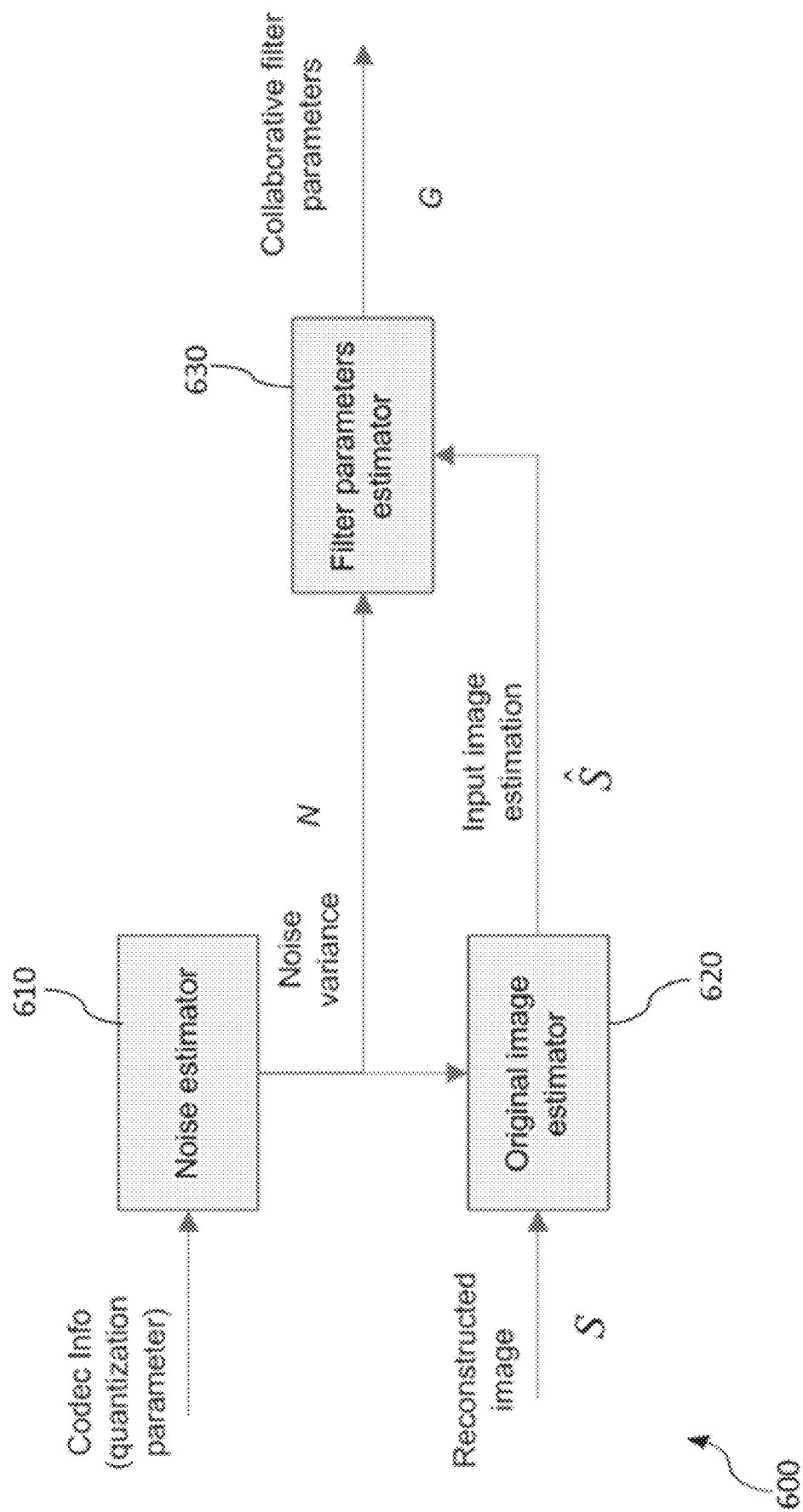
FIG. 6 is a block diagram of a filter parameter estimator in accordance with a further embodiment of the present invention.

FIG. 6 shows a block diagram which illustrates an operation of a parameter estimation block 600, e.g. the parameter estimation block 410 of FIG. 4 or the parameter estimation block 510 of FIG. 5. The parameter estimation block 600 comprises a noise estimator 610, an original image estimator 620 and a filter parameter estimator 630. The noise estimator 610 derives a quantization noise variance as function from a Quantization parameter QP. The original image estimator 620 estimates an original image (source image) from a reconstructed (decoded) image. Only the reconstructed image and the noise variance are used for source image estimation. The filter parameter estimator 630 estimates collaborative filter parameters based on source image estimation and noise variance derived from encoder service parameters. For the Wiener collaborative filter case this block calculates a frequency impulse filter response. In detail, this process will be described below.

Figure 7:
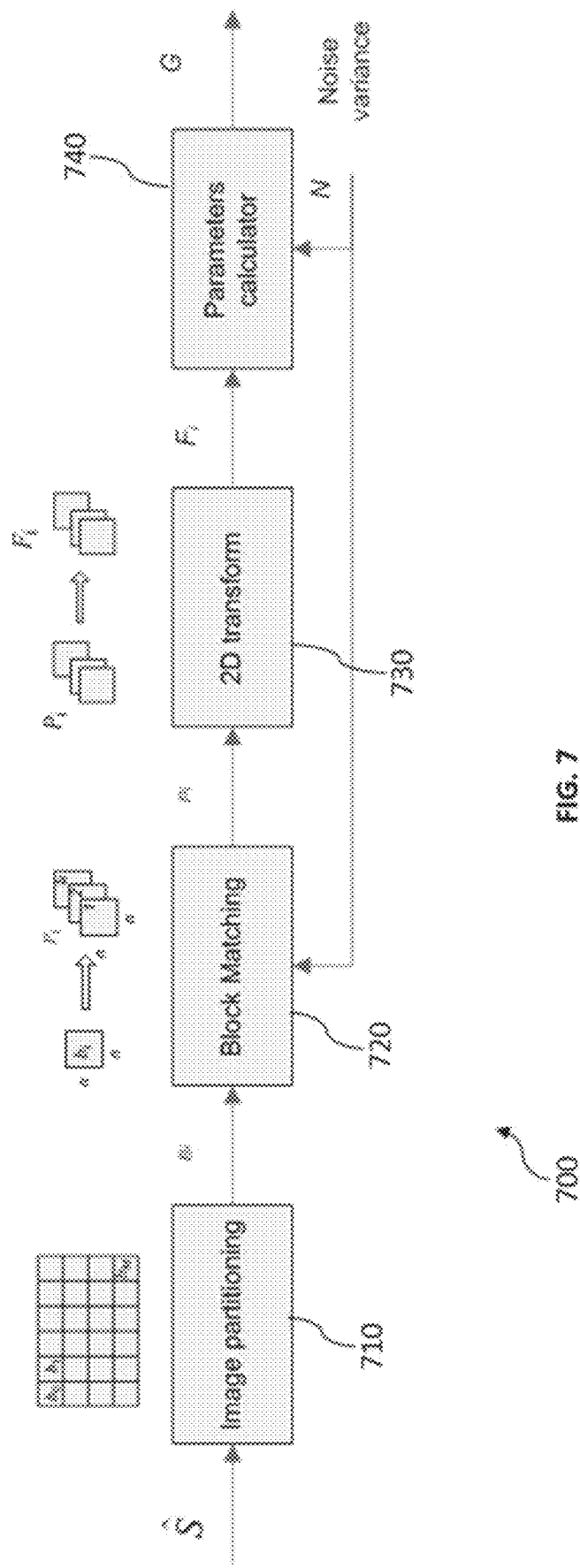
FIG. 7 is a flow chart of a filter parameter estimator in accordance with a further embodiment of the present invention.

FIG. 7 shows a flow chart which illustrates operation of a filter parameter estimator 700. The filter parameter estimator comprises an image partitioning block 710, a block matching block 720, a 2D transform block 730 and a parameter calculator block 740. The image partitioning block generates a set of macroblocks which cover the reconstructed image. Then, for each macroblock from this set, the block matching block 720 finds k closest blocks using a MSE metric. Found patches are grouped to clusters. For each patch from a cluster a 2D transform is performed in the 2D transform block 730. For each group of frequency domain patches (wherein each frequency domain patch is a 2D spectrum of a pixel domain patch) collaborative filter parameters are calculated in the parameter calculator block 740. For the particular case of Wiener collaborative filtering, the frequency impulse response is calculated in the parameters calculator functional block 740.

FIG. 8 shows pseudo-code 800 of a filter parameter estimation in details for a general case and for a Wiener collaborative filter. On the first processing step, a partitioning procedure creates a macroblocks set $B=\{b_1, b_2, \ldots, b_M\}$ covered source image estimation, where M is the number of macroblocks and $b_i$ is the i-th reference macroblock. Then, for each reference macroblock $b_i$ k closest blocks are found using a MSE metric during a block matching procedure $P_i = \text{BlockMatch}(\hat{S}, b_i) = \{b_i, p_i^0, p_i^1, p_i^2, \ldots, p_i^{k-1}\}$, where $\hat{S}$ is a source image estimation from a reconstructed image and $p_i^j$–j patch corresponding to $b_i$ reference macroblock. On the next stage for each patch from pixel domain cluster $P_i$ 2D transform is performed. Frequency domain cluster $F_i$ includes 2D spectra of pixel domain patches from a pixel domain cluster $P_i$ is used for collaborative filter parameter estimation (These filter parameters are used for filtering all patches from $P_i$). In the general case, filter parameters are a function from a frequency domain cluster and noise variance $G_i = \text{Func}(F_i, N)$.

Figure 9:
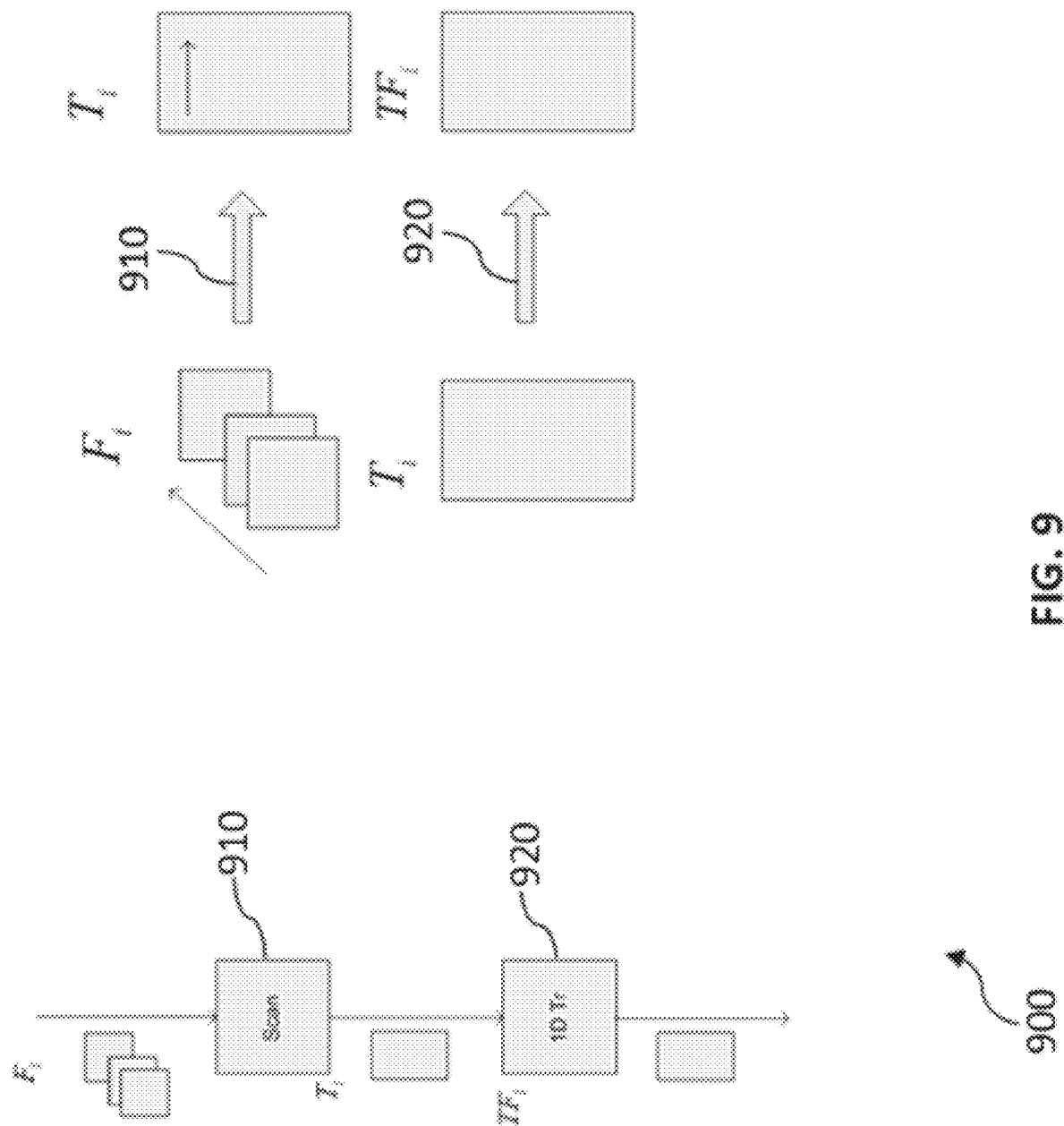
FIG. 9 is a schematic illustration of a StackTransform ( ) procedure in accordance with a further embodiment of the present invention.

For the particular case of Wiener collaborative filter the frequency impulse response (filter parameter in frequency domain) can be determined using the following procedure. At the first step a StackTransform( ) procedure is performed for each frequency domain cluster $F_i$ FIG. 9 is a schematic illustration of the StackTransform( ) procedure. The StackTransform( ) procedure is performed in two steps. In a first step 910, the auxiliary matrix $T_i$ is created based on frequency domain cluster $F_i$ scanning.

The following scanning rule is used: each row of matrix $T_i$ consists of frequency component from different patch of the same frequency domain cluster $F_i$ with the same spatial frequencies [v,w]:

$$T_i = \begin{pmatrix} t_1 \\ t_2 \\ \ldots \\ t_{n \times n} \end{pmatrix},$$

$t_j = (f_i^0[v, w], f_i^1[v, w], \ldots, f_i^{k-1}[v, w]),$ $v = 0, \ldots, n-1;$ $w = 0, \ldots, n-1$ $j = v \cdot n + w$ On the last step 920 of the StackTransform( ) procedure the output matrix $TF_i$ is created. Each row of this matrix is a 1D transform 920 of a corresponding row of $T_i$ matrix.

A frequency impulse response for a Wiener collaborative filter is determined by the following equation:

$$g_{vw}^i(\Omega) = \frac{(tf_{vw}^i(\Omega))^2}{(tf_{vw}^i(\Omega))^2 + N^2}$$

wherein $\Omega$ is a column number in matrix $tf_{vw}^i$, spatial frequencies v,w correspond to a j-th row of matrix $tf_{vw}^i$ and N is a quantization noise value derived from the codec signaling information.

Figure 10:
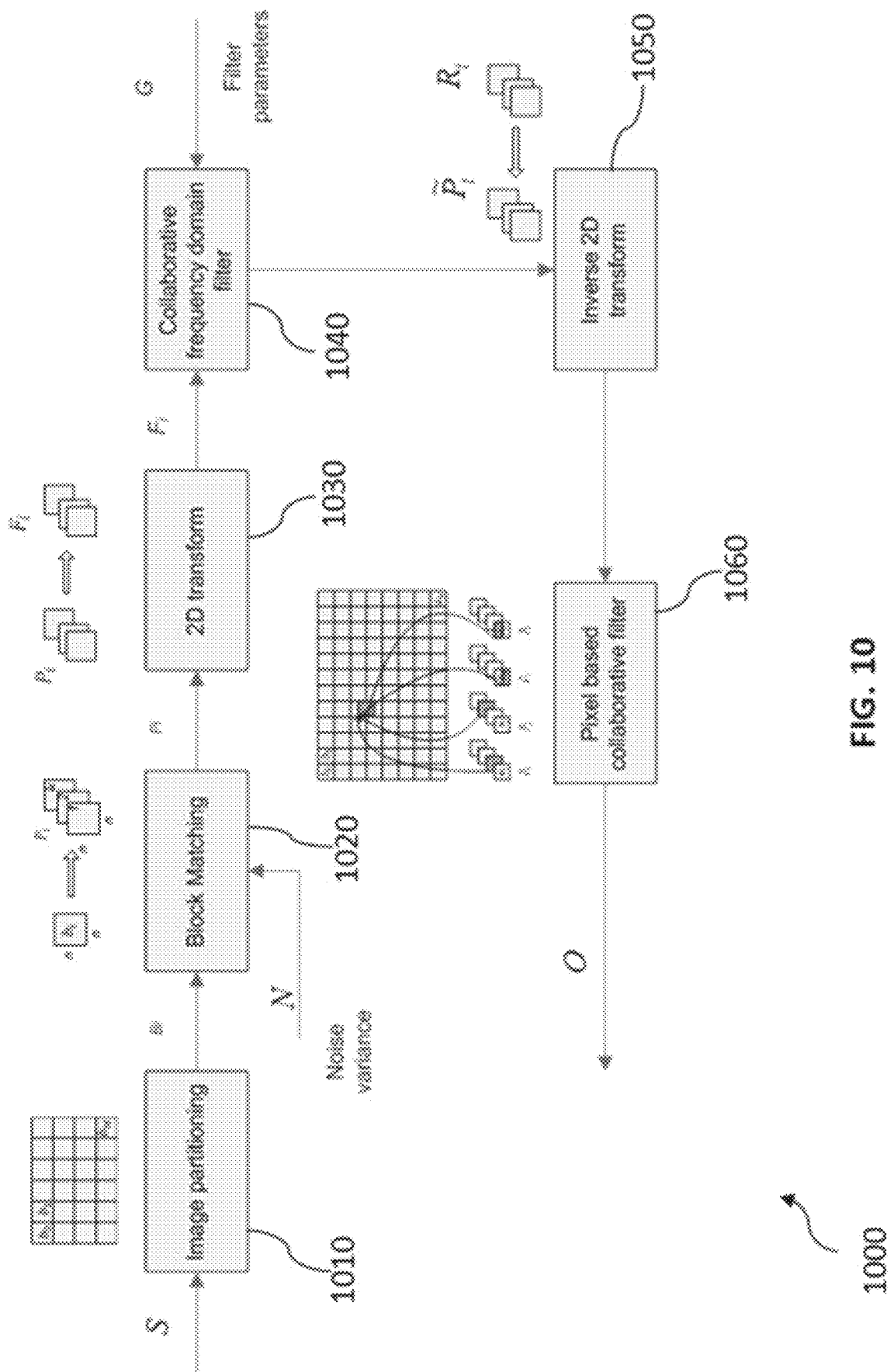
FIG. 10 is a flow chart of a mixed-domain collaborative filtering block in accordance with a further embodiment of the present invention.

FIG. 10 is a flow chart which illustrates an operation of a collaborative filter 1000 in a mixed domain. According to this figure the mixed domain collaborative filter 1000 comprises an image partitioning block 1010, a block matching block 1020, a 2D transform block 1030, an inverse 2D transform block 1050 and collaborative frequency filter 1040 and a pixel domain filter 1060.

As in the filter parameter estimator the image partitioning block 1010 creates a set of macroblocks which cover the reconstructed image. Then, for each reference macroblock from this set k closest blocks are found using a MSE metric by the block matching block 1020. In a next step, found spatial patches are combined in a pixel domain cluster corresponding to the reference macroblock. The 2D transform block 1030 performs a 2D transform over each patch in a chosen pixel domain cluster and produces a frequency domain cluster which comprises 2D spectra of corresponding pixel domain patches. The collaborative frequency domain filter 1040 performs collaborative filtering of 2D spectra of pixel domain patches using filter parameters calculated in the previous step. The inverse 2D transform block 1050 returns filtered frequency domain patches to the pixel domain. Then, pixel based collaborative filtering 1060 performs final averaging of pixel domain patches corresponding to the reference macroblock.

FIG. 11 shows a mixed domain collaborative filter pseudo-code 1100 in detail. In a first processing step a partitioning procedure creates a set of macroblocks $B=\{b_1, b_2, \ldots, b_M\}$ which cover a reconstructed (decoded) frame, where M is a number of macroblocks and $b_i$ is an i-th reference macroblock. Then, for each reference macroblock $b_i$ k closest blocks are found using a MSE metric during a block matching procedure $$P_i = \text{BlockMatch}(S, b_i) = \{b_i, p_i^0, p_i^1, p_i^2, \ldots, p_i^{k-1}\},$$

where S is the reconstructed image and $p_i^j$ is a j-th patch corresponding to the $b_i$ reference macroblock. In the next stage for each patch from pixel domain cluster $P_i$ a 2D transform is performed. A frequency domain cluster $F_i$ includes 2D spectra of pixel domain patches from pixel domain cluster $P_i$ is used for collaborative filtering. In a general case the collaborative filter in frequency domain performs frequency domain patch averaging and produces filtered frequency domain patches $$R_i = \text{FreqCollaborativeFiltering}(F_i, G_i)$$

corresponding to pixel domain patches. An inverse 2D transform returns filtered in frequency domain patches N to pixel domain and produces filtered pixel domain patches $\tilde{P}_i$. On the last processing stage frequency domain filtered patches $\tilde{P}_0, \tilde{P}_1, \ldots, \tilde{P}_M$ are averaged in pixel domain based on a procedure SameBlockAvg( ), which will be described below.

FIG. 12 shows pseudo code 1200 for a collaborative filter in a mixed domain for the Wiener filter case. As in the general case, reconstructed image partitioning, block matching procedure and 2D transform should be performed. Then, collaborative filtering of patch spectra should be performed in frequency domain. For this goal the StackTransform( ) procedure illustrated in FIG. 9 can be performed. Then Wiener filtering should be performed in frequency domain via stack (group) spectrum $TF_i$ multiplication by Wiener frequency impulse response $G_i$ calculated on previous step based on source signal spectrum estimation and noise variance. After this procedure an inverse stack transform over the multiplication result should be performed to get filtered frequency domain patches $R_i$. Then the same proceeding as in the general case should be performed.

Figure 13:
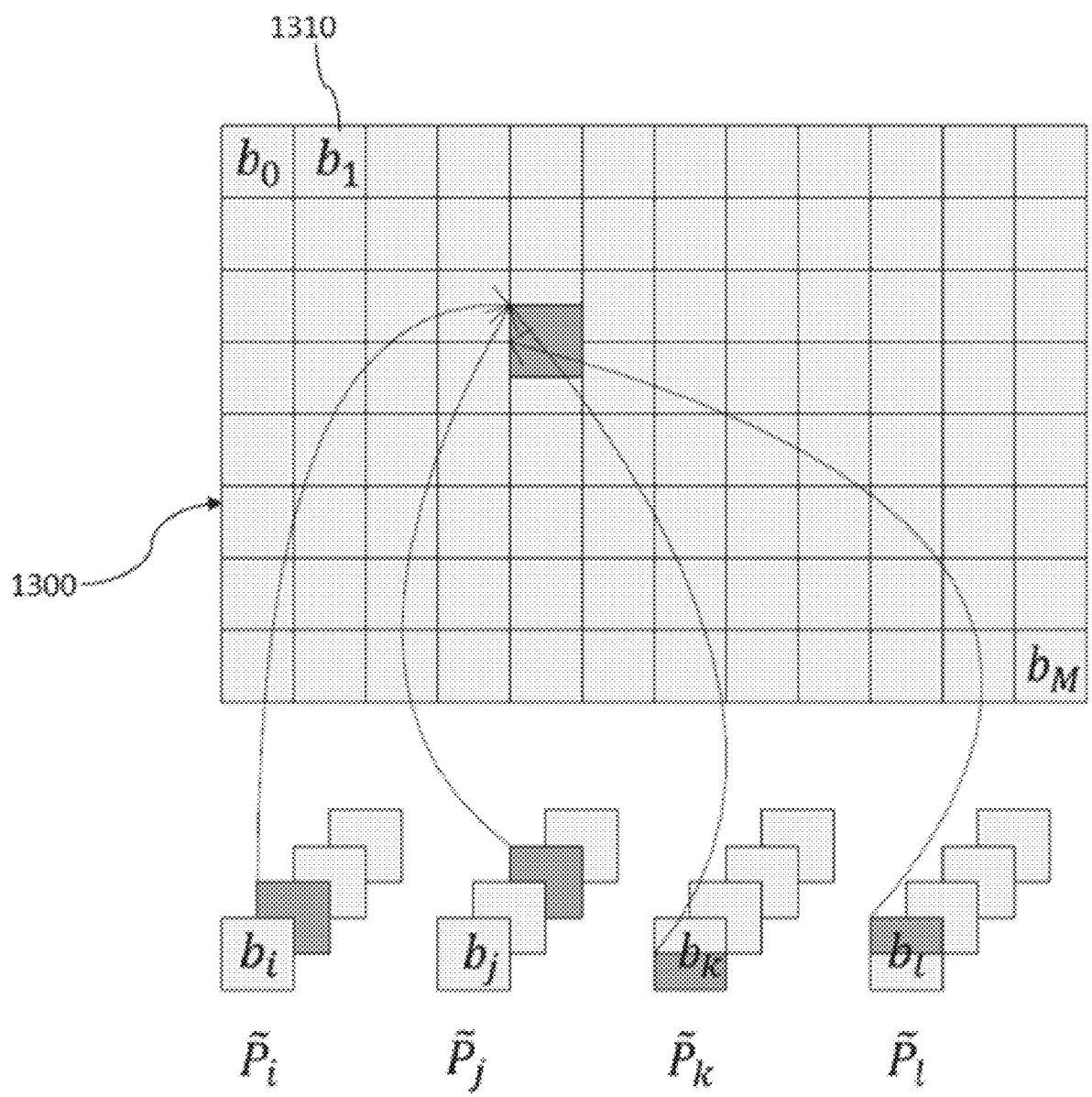
FIG. 13 is a schematic illustration of a pixel domain collaborative filter in accordance with a further embodiment of the present invention.

FIG. 13 illustrates collaborative filtering in the pixel domain (procedure SameBlockAvg( )). Filtering is based on the result of the collaborative filtering in the frequency domain. After collaborative filtering in the frequency domain for each reference macroblock 1310 from a reconstructed image 1300 there is set of filtered similar blocks which can be used for noise averaging. If averaging is performed along spatial patches noise from one side can be decreased, but this can lead to distortion of edges from the other side. So averaging is performed different way. Each macroblock in the reconstructed image can be a reference for one cluster of pixel patches and secondary for other pixel clusters. In each cluster, averaging is performed independently and so the same patch can be filtered in different clusters by different ways.

Collaborative filter in pixel domain averages the same patch (patch with fixed spatial coordinates) along all clusters which include this patch. This allows decreasing noise and introducing low edge distortion.

Figure 14:
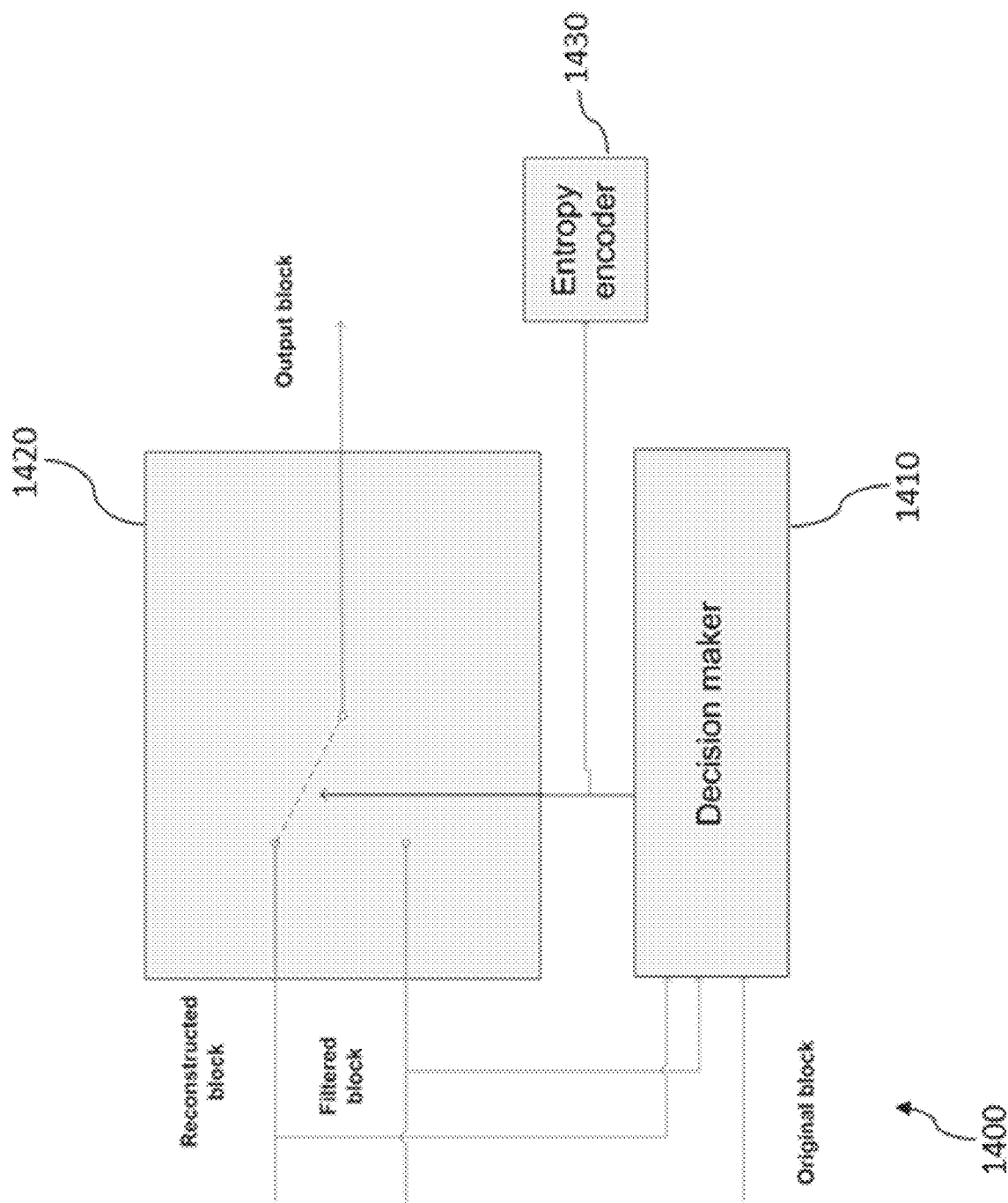
FIG. 14 is a block diagram of an application map block in accordance with a further embodiment of the present invention.

FIG. 14 shows a block diagram which illustrates operation of an application map block 1400, which is an application map unit. The application map block 1400 determines where the reconstructed image should be filtered and where the original reconstructed frame should be used for delivery for an end user. A block generation unit (not shown) generates a set of macroblocks which covers the reconstructed frame. Then, for each macroblock the decision maker block 1410 makes a decision about filter usage for the chosen macroblock during a rate distortion optimization (RDO) process. Correspondingly, a switch 1420 chooses an output block to be either the reconstructed block or the filtered block.

If a coding gain from removing quantization noise from the decoded image is significantly more than degradation of the filtered decoded image, then filtering is applied. Otherwise, a reconstructed image is used as output for an end user. The application map block decisions are encoded with an entropy encoder 1430 and transferred from encoder to decoder side.

As outlined above, embodiments of the invention overcome one or more of the following disadvantages of the Adaptive Loop Filter:

In ALF, filter parameters need to be transmitted from the encoder to the decoder, because the filter parameters cannot be estimated in the decoder (the original signal is absent in the decoder and so it cannot be used for filter parameters estimation).

In ALF, linear pixel domain filtering is used and potential benefits from non-linear filtering cannot be achieved.

In ALF, only local filtering is used and so spatial redundancy cannot be used fully.

Further embodiments of the present invention may include:
1. A method and an apparatus for still image coding (compression), comprising:
   reconstructing image generator corresponding to coded source image
   adaptive post filter in mixed domain (spatial frequency and pixel domain) applied to reconstructing image for post filtering (decoded signal improvement), where part of filter parameters is estimated from reconstructed image and second part of filter parameters is derived from encoder signaling information which is already encoded into bitstream and using for encoded signal reconstruction in codec's without post filtering
2. Same as previous, where both part of adaptive post filter parameters can be derived on the decoder side and so should not be encoded into bitstream.
3. Same as previous, where application map is implemented on the filter output for optimal tradeoff between quantization noise suppression and decoded video degradation.
4. Same as previous, where filter parameter estimation is based on original image estimation from reconstructed signal and quantization noise estimation.
5. Same as 1 to 3, where original image estimation is based on the reconstructed image only
6. Same as previous, where noise estimation is a function of an encoder quantization parameter (qp)
7. Same as previous, where the adaptive filter in the mixed domain comprises the following steps:
   Generating a set of patches covering the reconstructed image
   Spatial search of patches similar to reference block selected on the first stage
   Grouping found patches to clusters
   2D transform of each patch from each cluster
   Collaborative filtering in frequency domain of 2D pixels patches spectra corresponding to one cluster
   Inverse 2D transform of filtered frequency domain patches into pixel domain
   Averaging frequency domain filtered pixel patches in pixel domain with the same coordinates from different patch clusters
8. Same as 7, where Haar wavelet transform is used as 2D transform.
9. Same as 7 or 8, where Wiener collaborative filtering in frequency domain is used as collaborative filtering in frequency domain.
10. Same as previous, where adaptive_filtering_flag flag is used for event signaling when proposed compression tool should be used
11. Same as previous, where frame_level_usage_flag flag is used for signaling case when whole reconstructed image should be filtered
12. Same as previous, where macroblock_size determines macroblock size which should be used for filtering
13. Same as previous, where use_filtered_mb_flag flag shows whether filtered macroblock should be used The foregoing descriptions are only implementation manners of the present invention, the scope of the present invention is not limited to this. Any variations or replacements can be easily made through person skilled in the art. Therefore, the protection scope of the present invention should be subject to the protection scope of the attached claims.

What is claimed is:
1. An image coding apparatus, comprising:
   a processor; and
   a memory storing instructions that when executed configure the processor to:
   reconstruct an image;
   determine one or more filter parameters, based on one or more first parameters that are based on the reconstructed image and one or more second parameters which are based on codec signaling information;
   filter, in a frequency domain and a pixel domain, the reconstructed image based on the determined filter parameters to obtain a filtered image;
   estimate the original image from the reconstructed image; and
   determine the first parameters based on the estimated original image;
   wherein the processor is further configured to determine the filter parameters by:
      partitioning the estimated original image into blocks; and
      for each of the blocks;
         determine a cluster of patches that are similar to the block,
         2D-transform the cluster of patches to obtain transformed patches, and
         determine the first parameters based on the transformed patches;
   wherein the processor is further configured to determine, for each of the blocks, the filter parameters based on the transformed patches by:
      regrouping elements of the transformed patches to obtain a matrix $T_i$, wherein each row of the matrix $T_i$ comprises frequency components with same spatial frequencies,
      transforming the matrix $T_i$ to obtain a transformed matrix $tf_{vw}^i$, wherein each row of the matrix $tf_{vw}^i$ is a 1D transform of a corresponding row of matrix $T_i$, and
      determining the filter parameters $g_{vw}^i$ as:

$$g_{vw}^i(\Omega) = \frac{(tf_{vw}^i(\Omega))^2}{(tf_{vw}^i(\Omega))^2 + N^2}$$

wherein $\Omega$ is a column number in matrix $tf_{vw}^i$, spatial frequencies v,w correspond to a j-th row of the matrix $tf_{vw}^i$, and N is a quantization noise value derived from the codec signaling information.
2. The image coding apparatus of claim 1, wherein the processor is further configured to determine a quantization noise value from the codec signaling information and determine the second parameters based on the derived quantization noise value.
3. The image coding apparatus of claim 2, wherein the processor is further configured to analytically derive the quantization noise value from a quantization parameter QP of the codec signaling information.
4. The image coding apparatus of claim 1, wherein the processor is further configured to determine where filtering should be implemented.
5. The image coding apparatus of claim 1, wherein the processor is further configured to, for each of a set of blocks of the reconstructed image:
   determine a set of patches that are similar to the block;
   2D-transform the patches into a frequency domain to obtain frequency-domain patches;

perform collaborative filtering of the frequency-domain patches in the frequency domain to obtain filtered transformed frequency-domain patches;

inverse 2D transform the filtered transformed frequency-domain patches in the frequency domain to obtain filtered patches; and perform collaborative filtering of the filtered patches in the pixel domain along pixel patches from different sets of patches with the same spatial coordinates.

6. The image coding apparatus of claim 5, wherein the 2D transformation is a Haar wavelet transform.

7. The image coding apparatus of claim 5, wherein the processor is further configured to perform, for each of the blocks, the collaborative filtering based on the transformed patches by:

regrouping elements of the transformed patches to obtain a matrix $T_j$, wherein each row of the matrix $T_j$ comprises frequency components with same spatial frequencies;

transforming the matrix $T_j$ to obtain a transformed matrix $tf_{vw}^i$, wherein each row of the matrix $tf_{vw}^i$ is a 1D transform of a corresponding row of matrix $T_j$; and perform filtering by multiplying each element of matrix $tf_{vw}^i$ by a filter parameter $g(\Omega)_{vw}^i$, wherein $\Omega$ is a column number in matrix $tf_{vw}^i$ and spatial frequencies v,w correspond to a j-th row of matrix $tf_{vw}^i$.

8. The image coding apparatus of claim 1, wherein the 1D transformation is a Hadamard transform.

9. The image coding apparatus of claim 1, wherein:
the adaptive_filtering_flag is used to indicate that a mixed-domain filter should be used to filter an image,
the frame_level_usage_flag is used to indicate that the entire reconstructed image should be filtered,
the macroblock_size field is used to indicate a macroblock size which should be used for filtering, and
the use_filtered_mb_flag is used to indicate whether a filtered macroblock should be used.

10. A method for still image coding, the method comprising:
reconstructing an image;
determining one or more filter parameters based on one or more first parameters that are based on the reconstructed image and one or more second parameters that are based on codec signaling information;
filtering in a frequency domain and in a pixel domain the reconstructed image based on the determined filter parameters to obtain a filtered image;
estimating the original image from the reconstructed image; and
determining the first parameters based on the estimated original image;
wherein the filter parameters are determined by:
partitioning the estimated original image into blocks; and
for each of the blocks:
determining a cluster of patches that are similar to the block,
2D-transforming the cluster of patches to obtain transformed patches, and
determining the first parameters based on the transformed patches;
wherein the determining the first parameters based on the transformed patches comprises:

regrouping elements of the transformed patches to obtain a matrix $T_j$, wherein each row of the matrix $T_j$ comprises frequency components with same spatial frequencies, transforming the matrix $T_j$ to obtain a transformed matrix $tf_{vw}^i$, wherein each row of the matrix $tf_{vw}^i$ is a 1D transform of a corresponding row of matrix $T_j$, and determining the filter parameters $g_{vw}^i$ as:

$$g_{vw}^i(\Omega) = \frac{(tf_{vw}^i(\Omega))^2}{(tf_{vw}^i(\Omega))^2 + N^2}$$

wherein $\Omega$ is a column number in matrix $tf_{vw}^i$, spatial frequencies v,w correspond to a j-th row of the matrix $tf_{vw}^i$, and N is a quantization noise value derived from the codec signaling information.

11. A non-transitory computer-readable storage medium storing program code, the program code comprising instructions that when executed by a processor configure the processor to perform steps comprising:
reconstructing an image;
determining one or more filter parameters based on one or more first parameters that are based on the reconstructed image and one or more second parameters that are based on codec signaling information;
filtering in a frequency domain and in a pixel domain the reconstructed image based on the determined filter parameters to obtain a filtered image;
estimating the original image from the reconstructed image; and
determining the first parameters based on the estimated original image;
wherein the filter parameters are determined by:
partitioning the estimated original image into blocks; and
for each of the blocks:
determining a cluster of patches that are similar to the block,
2D-transforming the cluster of patches to obtain transformed patches, and
determining the first parameters based on the transformed patches;
wherein the determining the first parameters based on the transformed patches comprises:
regrouping elements of the transformed patches to obtain a matrix $T_j$, wherein each row of the matrix $T_j$ comprises frequency components with same spatial frequencies,
transforming the matrix $T_j$ to obtain a transformed matrix $tf_{vw}^i$, wherein each row of the matrix $tf_{vw}^i$ is a 1D transform of a corresponding row of matrix $T_j$, and
determining the filter parameters $g_{vw}^i$ as:

$$g_{vw}^i(\Omega) = \frac{(tf_{vw}^i(\Omega))^2}{(tf_{vw}^i(\Omega))^2 + N^2}$$

wherein $\Omega$ is a column number in matrix $tf_{vw}^i$, spatial frequencies v,w correspond to a j-th row of the matrix $tf_{vw}^i$, and N is a quantization noise value derived from the codec signaling information.

* * * * *